(12) United States Patent
Dai et al.

(10) Patent No.: US 7,538,062 B1
(45) Date of Patent: May 26, 2009

(54) SUBSTRATE-ENHANCED ELECTROLESS DEPOSITION (SEED) OF METAL NANOPARTICLES ON CARBON NANOTUBES

(75) Inventors: Liming Dai, Beavercreek, OH (US); Liangti Qu, Kettering, OH (US)

(73) Assignee: University of Dayton, Dayton, OH (US)

( * ) Notice: Subject to any disclaimer, the term of this patent is extended or adjusted under 35 U.S.C. 154(b) by 318 days.

(21) Appl. No.: 11/522,545

(22) Filed: Sep. 11, 2006

Related U.S. Application Data

(60) Provisional application No. 60/716,464, filed on Sep. 12, 2005.

(51) Int. Cl.
   *B01J 21/18* (2006.01)
(52) U.S. Cl. ............ 502/185; 502/184; 977/742; 977/748; 977/750; 977/752; 977/842; 977/890; 427/125; 427/126.1; 427/180
(58) Field of Classification Search ............ 502/184, 502/185; 977/742, 750, 752, 842, 748, 890; 427/125, 126.1, 180
See application file for complete search history.

(56) References Cited

U.S. PATENT DOCUMENTS

| | | | |
|---|---|---|---|
| 6,866,801 B1 * | 3/2005 | Mau et al. ............ | 264/29.1 |
| 6,967,013 B2 * | 11/2005 | Someya et al. ......... | 423/447.3 |
| 7,081,429 B2 * | 7/2006 | Kishi et al. ........... | 502/182 |
| 7,205,255 B2 * | 4/2007 | Yamamoto ............ | 502/101 |
| 7,396,798 B2 * | 7/2008 | Ma et al. ............. | 502/185 |
| 2005/0112049 A1 * | 5/2005 | Hofmeister .......... | 423/447.1 |
| 2005/0148174 A1 * | 7/2005 | Unger et al. .......... | 438/678 |

OTHER PUBLICATIONS

Search Report for PCT/US06/35511 (which corresponds to U.S. Appl. No. 60/716,464).*
Ajayan, P.M. et al, "Applications of Carbon Nanotubes" Topics Appl. Phys., 80, 2001, pp. 391-425.
Qu, Liangti et al., "Substrate-Enhanced Electroless Deposition of Metal Nanoparticles on Carbon Nanotubes," J.Am. Chem. Soc. 2005, 127, pp. 10806-10807.
Baughman, Ray H., et al., Article: "Carbon Nanotubes-the Route Toward Applications", http://web.ebscohost.com, Dec. 19, 2006, pp. 1-14.
Kong, Jing et al., "Functionalized Carbon Nanotubes for Molecular Hydrogen Sensors", Adv. Matter, 2001, 13, No. 18, Sep. 14, pp. 1384-1386.
Ye, Xiang-Rong et al., "Supercritical fluid synthesis and characterization of catalytic metal nanoparticles on carbon nanotubes", J. Mater. Chem. 2004, 14, pp. 908-913.
Choi, Hee Cheul et al., "Spontaneous Reduction of Metal Ions on the Sidewalls of Carbon Nanotubes", J. Am. Chem. Soc. 2002, 124, No. 31, pp. 9058-9059.

(Continued)

*Primary Examiner*—Patricia L Hailey
(74) *Attorney, Agent, or Firm*—Dinsmore & Shohl LLP

(57) ABSTRACT

An electroless deposition method of depositing metal nanoparticles onto conductive substrates such as carbon nanotubes is provided. The carbon nanotubes are provided on a support comprising a metal substrate and then immersed in an aqueous solution containing metal ions. The metal substrate metal has a redox potential which is lower than that of the metal ions in solution such that the metal ions are readily reduced into metal nanoparticles on the carbon nanotubes.

12 Claims, 3 Drawing Sheets

OTHER PUBLICATIONS

Xing, Yangchuan, Synthesis and Electrochemical Characterization of Uniformly-Dispersed High Loading Pt Nanoparticles on Sonochemically-Treated Carbon Nanotubes, J. Phys. Chem. B 2004. vol. 108, pp. 19255-19259.

Azamian Bobak R. et al., "Directly observed covalent coupling of quantum dots to single-wall carbon nanotubes", Chem. Commun., 2002, pp. 366-367.

Li, De-Chang et al., "Structure and growth of aligned carbon nanotube films by pyrolysis", Chemical Physics Letters, 316 (2000) pp. 349-355.

Yang, Yongyuan et al., "Patterned Growth of Well-Aligned Carbon Nanotubes: A Photolithographic Approach", J. Am. Chem. Soc. 1999, 121, pp. 10832-10833.

Kim, Bumsu et al., "Functionalized Multiwall Carbon Nanotube/Gold Nanoparticle Composites", Langmuir 2004, 20, pp. 8239-8242.

Li, Jing et al., "Nanoscale Electroless Metal Deposition in Aligned Carbon Nanotubes", Chem. Mater. 1998, 10, vol. 7, pp. 1963-1967.

Wen, Xiaogang et al., "$Cu_2S$/Au Core/Sheath Nanowires Prepared by a Simple Redox Deposition Method", Nano Letters, 2002, vol. 2, No. 5, pp. 451-454.

Moghaddam, Minoo J. et al., "Highly Efficient Binding of DNA on the Sidewalls and Tips of Carbon Nanotubes Using Photochemistry", Nano Letters, 2004, vol. 4, No. 1, pp. 89-93.

Quinn, Bernadette M., et al., "Electrodeposition of Nobel Metal Nanoparticles on Carbon Nanotubes", J. Am. Chem. Soc. 2005, 127, No. 17, pp. 6146-6147.

\* cited by examiner

Fig. 3
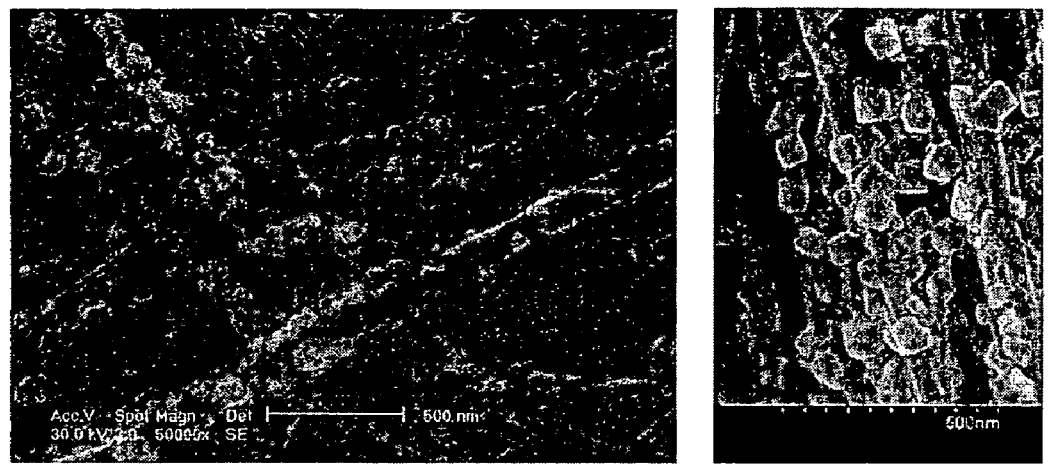
Outer wall
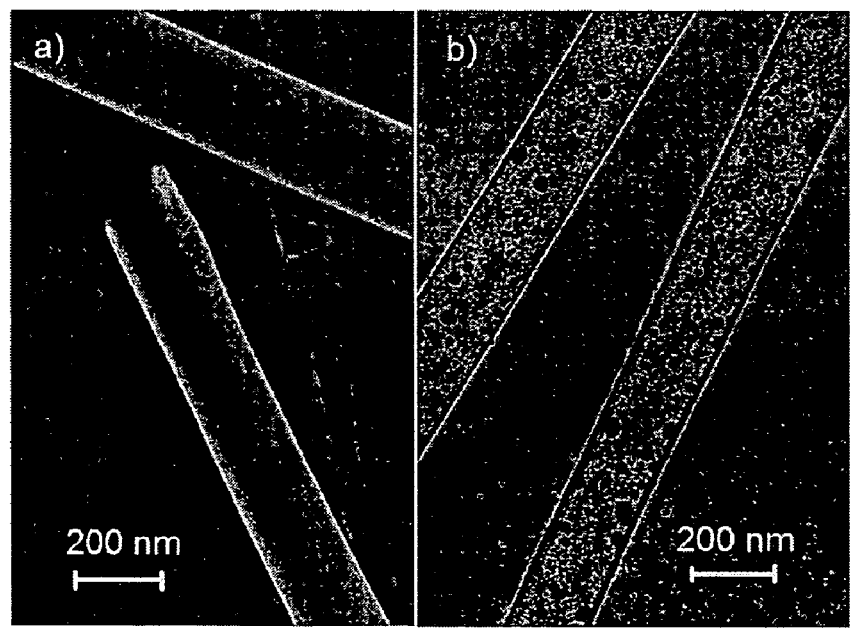
Inner wall
Fig. 4 tip

SUBSTRATE-ENHANCED ELECTROLESS DEPOSITION (SEED) OF METAL NANOPARTICLES ON CARBON NANOTUBES

CROSS REFERENCE TO RELATED APPLICATIONS

This application claims the benefit of U.S. Provisional Application No. 60/716,464 entitled SUBSTRATE-ENHANCED ELECTROLESS DEPOSITION (SEED) OF METAL NANOPARTICLES ON CONDUCTING SUBSTRATES filed Sep. 12, 2005. The entire contents of said application are hereby incorporated by reference.

BACKGROUND OF THE INVENTION

The present invention relates to a method of selectively depositing metal nanoparticles onto conductive substrates such as carbon nanotubes, and more particularly, to a method which allows electroless deposition of metal nanoparticles onto carbon nanotubes and other conductive substrates without the need for a reducing agent.

Carbon nanotubes have been demonstrated to possess excellent electronic properties, good chemical stability, and a large surface area. These unique properties make carbon nanotubes very useful for supporting metal nanoparticles in many potential applications, including advanced catalytic systems, electrochemical sensors, and highly efficient fuel cells. Consequently, functionalization of carbon nanotubes with metal nanoparticles is becoming increasingly important.

Several methods currently exist for attaching metal nanoparticles onto carbon nanotubes. Examples include chemical binding through DNA double helix linkages, electrochemical deposition, electroless deposition, and physical/chemical deposition on carbon nanotubes, with and without surface activation. Electroless deposition is of particular interest because its simplicity could potential facilitate large-scale production of nanotube-nanoparticle hybrids. However, general applications of electroless deposition have been limited due to the fact that only metal ions having a redox potential which is higher than that of a reducing agent or carbon nanotubes can be reduced into nanoparticles on the nanotube support. As a single-walled carbon nanotube (SWNT) has a redox potential of +0.5 V vs. SHE (standard hydrogen electrode), it is impossible to reduce $Cu^{2+}$ ($Cu(NO_3)_2$/Cu, +0.340 V vs. SHE) or $Ag^+$ ($Ag(NH_3)_2^+$/Ag+0.373 V vs. SHE) for deposition onto single walled carbon nanotubes via a galvanic displacement reaction without the aid of a reducing agent.

Accordingly, there is still a need in the art for an improved method of depositing metal nanoparticles onto conductive substrates such as carbon nanotubes.

SUMMARY OF THE INVENTION

The present invention meets that need by providing an electroless deposition method of depositing metal nanoparticles onto conductive substrates such as carbon nanotubes without the need for any additional reducing agents. The method may be used to deposit metal nanoparticles on both single-walled and multi-walled carbon nanotubes, as well as a number of other conducting substrates such as metal sheets, semiconductor substrates, and conductive polymer films. In addition, the method may be used to selectively attach metal nanoparticles to the side (outer) walls, inner walls, or end-tips of carbon nanotubes. With the method of the present invention, it is also possible to control the shape of the metal nanoparticles, for example, the nanoparticles may be deposited in the shape of spheres or cubes.

According to one aspect of the present invention, a method of depositing metal nanoparticles on conductive substrates is provided comprising providing a conductive substrate on a support comprising a metal substrate, and immersing the metal-supported conductive substrate in an aqueous solution comprising metal ions; where the redox potential of the metal substrate metal is lower than that of the metal ions in the aqueous solution.

The conductive substrate preferably comprises carbon nanotubes. The carbon nanotubes are preferably selected from single-walled or multi-walled nanotubes.

The metal substrate is preferably selected from the group consisting of Cu, Al, and Zn.

The metal ion solution preferably comprises an aqueous solution containing a metal ion selected from Cu, Ag, Au, Pt, and Pd. The metal ion solution is preferably selected from $HAuCl_4$, $K_2PtCl_4$, $(NH_4)_2PdCl_4$, $Cu(NO_3)_2$, and $Ag(NH_3)_2^+$.

Preferably, the metal-supported carbon nanotubes are immersed in the metal ion solution for about 10 to about 30 seconds. Upon immersion of the metal-supported carbon nanotubes in the metal ion solution, metal nanoparticles are formed from the reduced metal ions and are deposited along the side walls of the carbon nanotubes.

Accordingly, it is a feature of the present invention to provide an electroless deposition method of depositing metal nanoparticles on conductive substrates such as carbon nanotubes. Other features and advantages of the invention will be apparent from the following description, the accompanying drawings, and the appended claims.

BRIEF DESCRIPTION OF THE DRAWINGS

FIG. 3 is a photomicrograph illustrating the deposition of metal nanoparticles on the outer walls of carbon nanotubes;

FIG. 4 is a photomicrograph illustrating the deposition of metal nanoparticles on the inner walls of carbon nanotubes.

DETAILED DESCRIPTION OF THE PREFERRED EMBODIMENTS

With the method of the present invention, we have found that by supporting conductive substrates such as carbon nanotubes on a metal substrate having a redox potential which is lower than that of the metal ions in the solution in which the metal-supported nanotubes are immersed, the metal ions can be readily reduced into metal nanoparticles on the nanotubes/support. This method is referred to herein as substrate-enhanced electroless deposition (SEED).

The carbon nanotubes used in the present invention are preferably selected from single-walled or multi-walled nanotubes. Single-walled nanotubes are commercially available, for example, from HiPCo. Multi-walled nanotubes may be synthesized by pyrolysis of Iron (ii) phthalocyanine at about 900° C.

The metal substrate preferably comprises Cu, Al or Zn. The carbon nanotubes are preferably deposited onto the metal substrate by solution coating, or by physical contact transfer, such as absorption, press, etc.

After the carbon nanotubes are deposited on the metal substrate, the metal-supported carbon nanotubes are immersed in a metal ion solution for about 10 to about 30 seconds. The metal ion solution is preferably selected from $HAuCl_4$, $K_2PtCl_4$, $(NH_4)_2PdCl_4$, $Cu(NO_3)_2$, and $Ag(NH_3)_2^+$. Upon immersion of the metal-supported carbon nanotubes in the metal ion solution, metal nanoparticles (Cu, Ag, Au, Pt, or Pd) are formed from the reduced metal ions and are deposited along the nanotube sidewalls.

Figure 1:
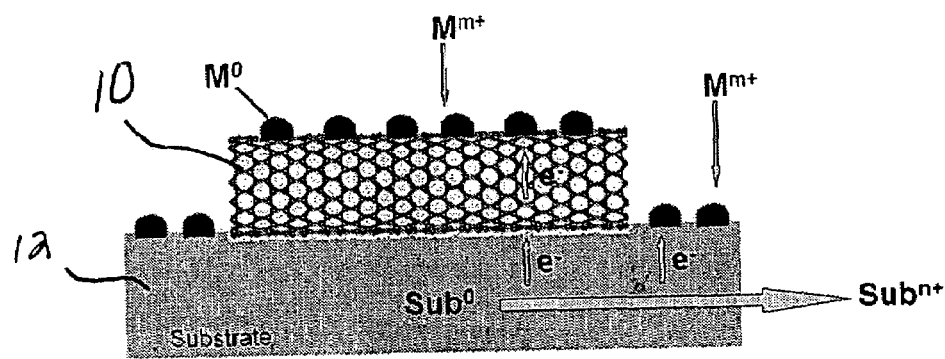
FIG. 1 is a schematic illustration of the method of the present invention.

Referring now to FIG. 1, the galvanic displacement reaction which governs the method of the present invention is shown. As can be seen, the deposition of metal nanoparticles is achieved via the redox reaction of a galvanic cell in which the carbon nanotube 10 acts as a cathode for metal deposition (M) from the reduction of metal ions ($M^{m+}$) in solution while the metal substrate 12 serves as an anode where metal atoms ($Sub^0$) are oxidized into ($Sub^{n+}$) followed by dissolution. The method of the present invention allows electroless deposition of any metal nanoparticles (M) on conducting carbon nanotubes as long as the redox potential of the substrate metal ($Sub^{n+}/Sub^0$) is lower than that of the metal ions ($M^{m+}/M$) in solution.

While the method described herein may be used to deposit metal nanoparticles on the outer walls of carbon nanotubes, we have found that the method can also be used to deposit metal nanoparticles on the inner walls of carbon nanotubes (as shown in FIG. 4) by protecting the outer walls of carbon nanotubes with the application of a non-conducting coating (such as an alumina membrane or polymeric coating) and opening the nanotube tips.

Figure 5:
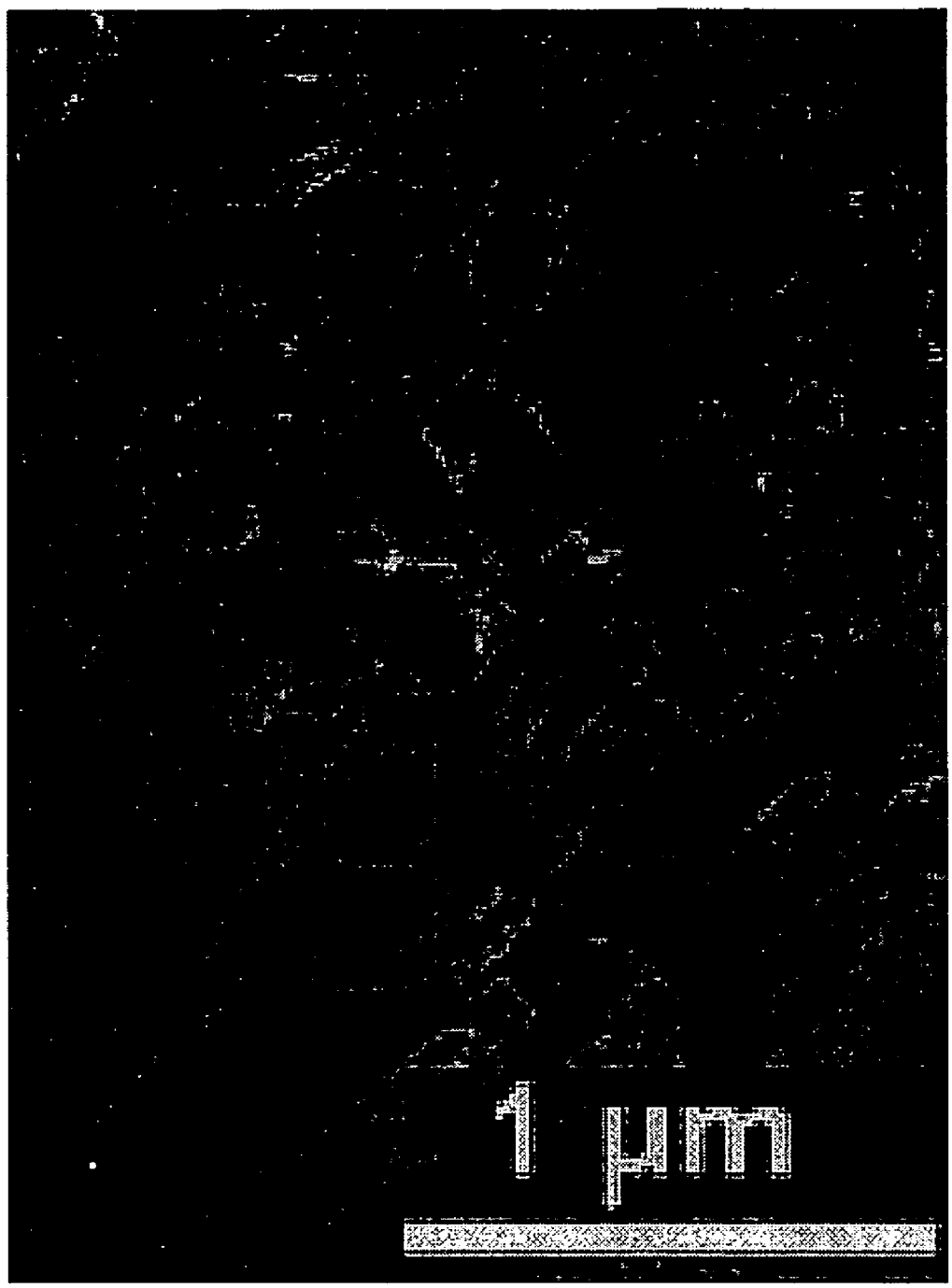
FIG. 5 is a photomicrograph illustrating the deposition of metal nanoparticles on carbon nanotube tips.

The tips of carbon nanotubes may also be modified by deposition of metal nanoparticles as shown in FIG. 5 by using perpendicularly aligned carbon nanotubes in the method.

Metal nanoparticles having a cubed or spherical shape can also be selectively deposited on the side walls, inner walls and tips of carbon nanotubes using the corresponding reaction conditions for the synthesis of shaped nanoparticles. See, for example, FIG. 3, which illustrates cubed-shaped nanoparticles deposited on the outer side walls of carbon nanotubes.

While the method of the present invention has been described herein primarily with regard to carbon nanotubes, it should be appreciated that the method can also be used to deposit metal nanoparticles on various conductive substrates such as metal and semiconducting films.

The resulting nanotube-supported metal nanoparticles are electrochemically active, and may be used in a number of applications, including advanced sensing and catalytic systems.

In order that the invention may be more readily understood, reference is made to the following examples which are intended to illustrate the invention, but not limit the scope thereof.

Example 1

Multi-walled carbon nanotubes were prepared by pyrolysis of iron (II) phthalocyanine (FePc). A scanning electron microscopy (Philips XL30 FEG) image of the FePc-generated multi-walled nanotubes randomly dispersed on a copper foil support (EMS US), showed that the pristine nanotubes possessed a smooth surface and were almost free from pyrolytic impurities on the nanotube surface (e.g. amorphous carbon and residual catalyst nanoparticles). Upon immersion of the Cu-supported multi-walled carbon nanotubes into an aqueous solution of $HAuCl_4$ (3.8 mM), Au nanoparticles spontaneously formed on the nanotube sidewalls. The SEM images taken at different stages during the process showed that the nucleation of Au nanoparticles started within seconds. Au clusters with a diameter of about 100 nm were clearly evident along the nanotube sidewalls after about 10 seconds of exposure to the $HAuCl_4$ solution. Longer reaction times caused no obvious change in the particle size but caused a significant increase in the density of particles along the nanotube length. This indicates that particle nucleation on nanotubes is fast (less than 10 seconds) and not correlated with any defect site of the nanotube structure. A transmission electron microscopy (TEM, Hitachi H-7600) image showed a relatively homogenous distribution of nanoparticles along the nanotubes.

While not wishing to be bound to any theory, we believe that the nanoparticle growth process is controlled by the diffusion of $AuCl_4^-$ from the bulk solution to the nanotube/solution interface. With this controlled diffusion, smaller particles often gain a faster growth than larger particles due to relatively more surface receiving sites for the metal ions intrinsically associated with their higher surface-to-volume ratios.

Figure 2:
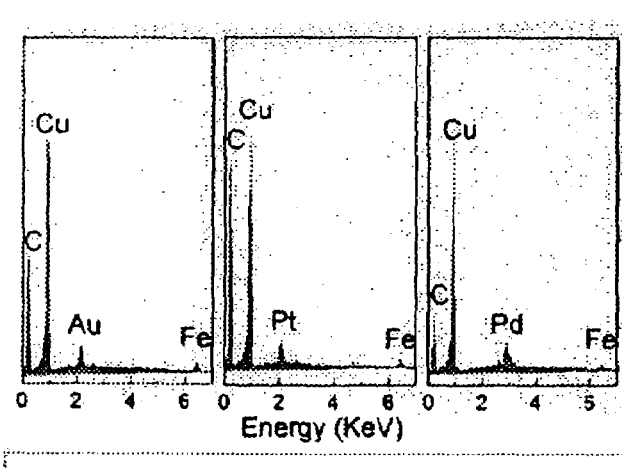
FIG. 2 is a graph illustrating EDX spectra for Au-, Pt-, and Pd-nanoparticle coated multi-walled nanotubes on a copper foil substrate.

Similar galvanic displacement reactions were observed for Cu-supported carbon nanotubes immersed in aqueous solutions of $K_2PtCl_4$ (4.8 mM) and $(NH_4)_2PdCl_4$ (7.0 mM). Energy dispersive X-ray analyses (EDX) on the Au, Pt, and Pd nanoparticle-coated carbon nanotubes shown in FIG. 2 clearly show peaks of Au, Pt, and Pd, respectively, along with peaks for Cu, C, and Fe arising from the copper substrate and traces of Fe catalyst possibly end-encapsulated within the nanotube structure.

Au, Pt, and Pd metal nanoparticles were also electrolessly deposited onto Cu-supported single-walled carbon nanotubes using the method of the present invention.

Example 2

Pt metal nanoparticles having a cubic shape were deposited onto carbon nanotubes by immersing Cu-supported carbon nanotubes into an aqueous solution of $K_2PtCl_4$ under different conditions: 3.8 mM $K_2PtCl_4$ and 5 mM $CuCl_2$ for 1 minute; 0.95 mM $K_2PtCl_4$ for 30 minutes. While not wishing to be bound to any theory, we believe that the $Cu^{2+}$ ions act as a capping reagent to regulate the shape of the nanoparticles.

Example 3

Pt nanoparticles in the shape of spheres were deposited onto the inner walls of carbon nanotubes. First, a template-synthesized, aligned carbon nanotubes contained within an alumina membrane were immersed into an aqueous solution of 1.9 mM $K_2PtCl_4$ under ultrasonication for 5 minutes. (The template-synthesized carbon nanotubes were prepared by pyrolysis of acetylene in an alumina membrane (about 200 nm) at 700° C.). After removing the remaining solution on the surface of the alumina membrane by adsorption with a filter paper, the alumina-membrane-supported aligned carbon nanotube film was perpendicularly anchored to a copper foil using tapes and then re-immersed the aqueous solution of 1.9 mM $K_2PtCl_4$ for 30 minutes, which resulted in the formation of Pt nanospheres on the nanotube inner wall (see FIG. 4). The modified carbon nanotubes were then released from the alumina membrane using an aqueous HF solution.

The modified carbon nanotubes were then supported on a Cu foil in a side-wall on configuration, i.e., the sidewalls were in contact with the Cu foil, and immersed in an aqueous solution of 3.8 mM $K_2PtCl_4$ containing 5 mM $CuCl_2$ for 1 minute such that the outer walls of the carbon nanotubes were modified with cubic shaped Pt nanoparticles (see FIG. 3).

Example 4

Pt nanoparticles in the form of cubes were deposited onto carbon nanotube tips by floating a Cu foil-supported perpendicularly aligned carbon nanotube film on an aqueous solution of 3.8 mM $K_2PtCl_4$ containing 5 mM $CuCl_2$ for 1 minute (see FIG. 5).

Pt nanoparticles in the form of spheres were deposited onto carbon nanotube tips by floating a Cu foil-supported perpendicularly aligned carbon nanotube film on an aqueous solution of 0.95 mM $K_2PtCl_4$ for 30 minutes.

Example 5

An Au nanometer-sized box of hollow hexahedron was generated by immersing Cu foil-supported carbon nanotubes into an aqueous solution of 3.8 mM $K_2PtCl_4$ and 5 mM $CUCl_2$ for 1 minute followed by exposing the Pt-deposited nanotubes to an aqueous solution of 1 mM $HAuCl_4$ via the following galvanic displacement reaction:

$$3Pt(s) + 2AuCl_4^-(aq) \rightarrow 2Au(s) + 3Pt^{2+}(aq) + 8Cl^-(aq)$$

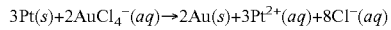

Having described the invention in detail and by reference to preferred embodiments thereof, it will be apparent that modifications and variations are possible without departing from the scope of the invention.

What is claimed is:

1. A method of depositing metal nanoparticles on conductive substrates consisting of:
   providing a conductive substrate on a support comprising a metal substrate selected from Cu, Al and Zn; and
   immersing said metal-supported conductive substrate in an aqueous solution containing metal ions selected from $HAuCl_4$, $K_2PtCl_4$, $(NH_4)_2PdCl_4$, $Cu(NO_3)_2$, and $Ag(NH_3)_2^+$; where the redox potential of the metal substrate is lower than the redox potential of the metal ions in said solution.

2. The method of claim 1 wherein said conductive substrate comprises carbon nanotubes.

3. The method of claim 2 wherein said metal supported carbon nanotubes are immersed in said aqueous metal ion solution for about 10 to about 30 seconds.

4. The method of claim 2 wherein said metal nanoparticles are deposited on the side walls of said carbon nanotubes.

5. The method of claim 2 wherein said metal nanoparticles are deposited onto the inner walls of said carbon nanotubes.

6. The method of claim 2 wherein said metal nanoparticles are deposited onto the tips of said carbon nanotubes.

7. The method of claim 1 wherein said carbon nanotubes are selected from single-walled or multi-walled carbon nanotubes.

8. The method of claim 1 wherein said metal ions are selected from Cu, Au, Pt, Pd, and Ag.

9. The method of claim 1 wherein said metal nanoparticles have a cubic shape.

10. The method of claim 1 wherein said metal nanoparticles have a spherical shape.

11. The method of claim 1 wherein said carbon nanotubes are perpendicularly aligned.

12. Carbon nanotubes having metal nanoparticles deposited thereon by the method of claim 1.

* * * * *

UNITED STATES PATENT AND TRADEMARK OFFICE
CERTIFICATE OF CORRECTION

| | | |
|---|---|---|
| PATENT NO. | : 7,538,062 B1 | Page 1 of 1 |
| APPLICATION NO. | : 11/522545 | |
| DATED | : May 26, 2009 | |
| INVENTOR(S) | : Liming Dai et al. | |

It is certified that error appears in the above-identified patent and that said Letters Patent is hereby corrected as shown below:

Column 1, Line 4, after title, insert:

--STATEMENT REGARDING FEDERALLY SPONSORED RESEARCH OR DEVELOPMENT

This invention was made with government support under Contract No. FA8652-03-3-005 awarded by the Wright Brothers Institute, AFRL. The government has certain rights in the invention.--

Signed and Sealed this

Eighth Day of December, 2009

David J. Kappos
*Director of the United States Patent and Trademark Office*